(12) United States Patent
Xiao et al.

(10) Patent No.: US 7,672,811 B2
(45) Date of Patent: Mar. 2, 2010

(54) SYSTEM AND METHOD FOR PRODUCTION SYSTEM PERFORMANCE PREDICTION

(75) Inventors: Guoxian Xiao, Troy, MI (US); Pulak Bandyopadhyay, Rochester Hills, MI (US); Ram Dwibhashyam, Lake Orion, MI (US); Basel Q. Shadid, St. Catherines (CA); Jorge F. Arinez, Bloomfield Hills, MI (US); Leandro G. Barajas, Rochester Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 943 days.

(21) Appl. No.: 11/155,098

(22) Filed: Jun. 17, 2005

(65) Prior Publication Data

US 2006/0288260 A1    Dec. 21, 2006

(51) Int. Cl.
*G06F 11/07* (2006.01)

(52) U.S. Cl. .................. 702/185; 702/179; 702/183; 702/186

(58) Field of Classification Search .................. 702/108, 702/179, 183–188; 700/79; 707/203; 709/224; 714/26

See application file for complete search history.

(56) References Cited

U.S. PATENT DOCUMENTS

| | | | | |
|---|---|---|---|---|
| 6,012,152 | A * | 1/2000 | Douik et al. | 714/26 |
| 6,343,236 | B1 * | 1/2002 | Gibson et al. | 700/79 |
| 6,650,949 | B1 * | 11/2003 | Fera et al. | 700/79 |
| 7,197,503 | B2 * | 3/2007 | Palanisamy et al. | 707/101 |
| 7,260,505 | B2 * | 8/2007 | Felke et al. | 702/187 |

* cited by examiner

*Primary Examiner*—Eliseo Ramos Feliciano
*Assistant Examiner*—Felix E Suarez (57) ABSTRACT

Disclosed herein are a system, method and apparatus for reporting, making alerts and predicting fault codes generated by machines in a line. Historical fault code data is received and filtered according to particular criteria to generate filtered fault code data. Classification of the filtered fault code data into physical groups and into logical groups is followed by sorting the groups to produce fault trend data. Processing the fault trend data with a plurality of analyzers generates output including reports, alerts, and predictions of future fault code occurrences.

23 Claims, 4 Drawing Sheets

SYSTEM AND METHOD FOR PRODUCTION SYSTEM PERFORMANCE PREDICTION

FIELD OF THE INVENTION

This invention relates to analyzing fault code data, and more particularly a system, method and apparatus for processing historical fault codes to generate reports, alerts and predictions.

BACKGROUND OF THE INVENTION

In large scale manufacturing and assembly plants, such as those used in automobile manufacturing, hundreds of machines and their machine operators may work simultaneously. In a large production environment, the production line may include miles of conveyors. The plant itself may be millions of square feet. An increase in the precision of production timing and/or control may provide better resource allocation. Accordingly, processes and controls that keep the line moving may increase production and reduce expenses.

In a single shift, a machine station, for example at an automotive plant, may process up to hundreds, even thousands, of products. The conveyor belt may move at several feet per second. The line moves fast and operations are complex. In large assembly or manufacturing plants, thousands of machines may be grouped into more than one hundred stations. Many plants are substantially automated, where machines on the production line may be equipped with programmable logic controllers (PLCs) or industrial PCs to control machine operations, and monitor machine state.

For many different reasons, a machine may malfunction or change state and generate a fault or event code. There may be as many as one thousand fault codes associated per machine. A fault code is an industry term to indicate a symptom and sometimes the cause of a problem with a machine. Much like in a modern automobile, sensors are disposed in a machine to detect when out of the ordinary situations occur. In the case of an automobile, for example, if a door is left ajar, a fault or event code will be generated to alert the occupant that a door is ajar. Fault or event codes, when generated, may be electronically sent to a central location when a machine stops operating. Fault codes are typically stored for a short period and then discarded.

In general the machines do not generate fault codes but event codes. Most event codes do not reflect any abnormal behavior of the machine. They merely inform about the status of the machine. For example, if a machine does not receive a part in n seconds then it generates an event code to indicate that a time-out has occurred and that it may require human intervention. A fault code or event code does not necessarily mean that the machine is down. Actually many event codes are generated while the machine still runs, e.g., a machine may generate an event code saying that 10,000 cycles have passed since a tool change was done and that likely it will need a new tool soon. However such an event code may not stop operations.

In a large plant, when one machine fails, its entire station or zone may stop operating, and thus the impact of the failure may be high. Parts to be processed by the machine or station may accumulate, with machines that are feeding the halted machine becoming blocked because the buffer upstream of the halted machine has filled. Moreover, parts discharged for further processing by a downstream machine may drain from the buffer downstream of the halted machine, with machines that are drawing from that buffer becoming starved. The impact of a downed machine or station can quickly spread to other machines and stations of the production line.

The maintenance staff is best utilized carrying out its primary task of maintaining the machines with preventative maintenance. Maintenance staff's primary task also includes repairing significant equipment failures. While routine maintenance may be planned, faults are not predicted in a dynamic way. Thus, maintenance and repair resources may at times be overwhelmed in the number of fault codes received from the line. Different algorithms and analyzers have been developed using real-time sensing data from machine key parts or subsystems to estimate machine performance. Real-time processing requires many sensors embedded in machines and their signals cause a large amount of data traffic for real-time production systems (especially in the automotive industry).

SUMMARY OF THE INVENTION

Disclosed herein are a system, method and apparatus for processing historical data for reporting, making alerts and predicting event and fault codes generated by machines in a line. Herein, the terms event codes and fault codes may be used interchangeably, as well as other names for sensed or observed operational statuses. Historical fault code data is received and filtered according to particular criteria to generate filtered fault code data or other relevant information. Classification of the filtered fault code data into physical groups and into logical groups is followed by sorting the groups to produce fault trend data. Processing the fault trend data with a plurality of analyzers generates output including reports, alerts, and predictions of future fault code occurrences.

DETAILED DESCRIPTION OF THE INVENTION

Fault codes or event codes are generated by machine controllers and are traditionally used to trigger repair orders or request some kind of human intervention, and sometimes to help diagnose problems. As disclosed herein, fault codes and event codes may be used interchangeably. As described herein, fault codes are collected from machine controllers, usually PLCs, and then may be temporarily stored in one or more databases for a predetermined period of time prior to processing. Databases may have rollover periods ranging from days up to years depending on the amount of data that is being acquired. According to that which is described herein, preprocessing and then processing by a plurality of prediction analyzers provides reports, alerts and prediction of future fault code generation. In this way, performance prediction for a production system may improve maintenance efficiency. Prediction of fault codes and also categorization of fault codes based on their criticality or impact on the line may help maintain smoother operations of a line.

This invention may be embodied in the form of any number of computer-implemented processes and apparatuses for practicing those processes. Embodiments of the invention may be in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 1:
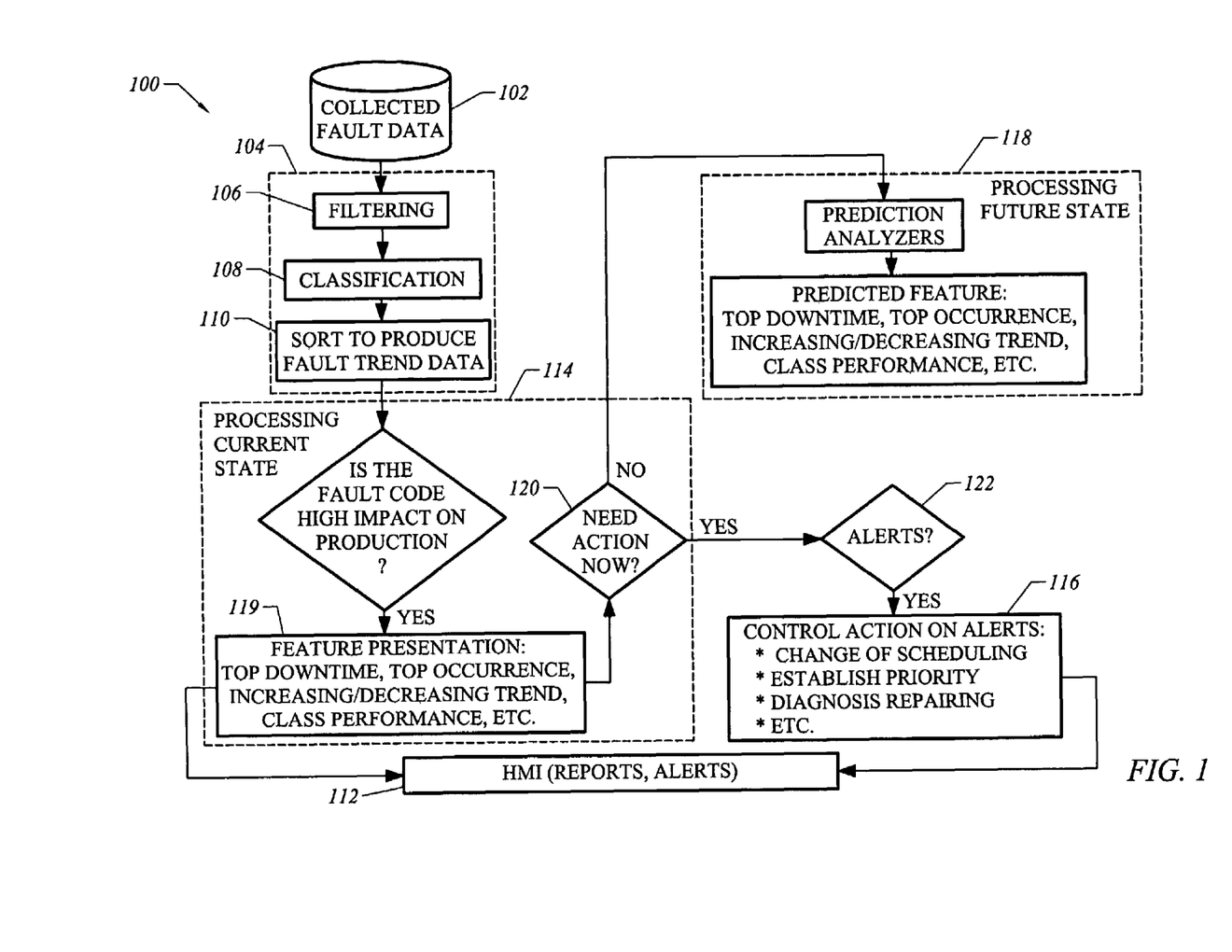
FIG. 1 is a flow chart showing a fault module and its integral analysis component tools.

FIG. 1 is a flow chart showing a fault module 100 and analysis component tools. It will be understood that the historical fault code data is collected from machine controllers and stored in data base 102 (see FIG. 5). The data is retrieved from the database and processed by a preprocessing module 104. In filtering the data 106 there may be at least several algorithms by which to filter the historical data. Filtering may for instance remove those data representing downtime caused by an event that includes break time or other non-production time (such as weekend time and holidays). Additionally, filtering may also remove multiple faults or events happening on the same equipment. Moreover, filtering can combine fault time stamps into one time, if, for example, the time between two consecutive fault events is too short. Depending upon the analyzing algorithm applications, different considerations for filtering may be taken into account.

After filtering, the fault codes may be classified into two or more groups by preprocessing module 104. The classification step 108 classifies the filtered data into physical groups, logical groups, and/or ad hoc groups. Other groups, depending upon the application, may also be classified by the preprocessing module 104.

Equipment sensory data may be used to evaluate component performance and to improve the machine fault prediction. A sensor in a machine may detect a condition or particular state or occurrence in the machine. The sensor communicates data to the machine's controller (PLC), which then may pass the information as raw binary data to a database. For a particular event, the database may include a time-stamped entry of '1' when an event code is passed to the database, and an entry of '0' for time periods when the corresponding event is not passed by the PLC to the database.

Before analysis by fault module 100, an initial conversion of binary data may be made. A contiguous string of 1s associated with an event code may be entered in a database as a record including the event code name or number (or other identifier), the length of the string of 1s (in, for example, seconds), the start time, end time, or both start time and end time, a machine identifier, and possibly other information as may be provided by the PLC. This other information may include, for example, a text fault code description, or a keyword (which again may be just a number, or possibly a text mask).

The same fault code may have a variable inside the description, i.e., every time that same fault is generated a slightly different fault message may be provided by the PLC, for example, the number of counts of that specific fault since the last reset, or the pallet number in which the part was placed when the fault was generated. Punctuation in the text message may provide structure in the record entered in the database. The database record may also include text describing possible resolution of the event. The record may further include a hierarchical fault description, for example, a main fault description, as well as a more specific, and/or more descriptive fault description. The record may include, in addition to fields for fault code and fault code type, fields for a fault code group, for the machine, the machine's station, zone, line, and plant. Fields such as these and others may also be used for grouping the data for processing.

The initial conversion from binary data to a database record as described above may take place after the PLC has passed the raw binary data to a database. Alternatively, the initial conversion may take place in the PLC or another processor within the machine or station, before being passed to a central or other database.

Figure 2:
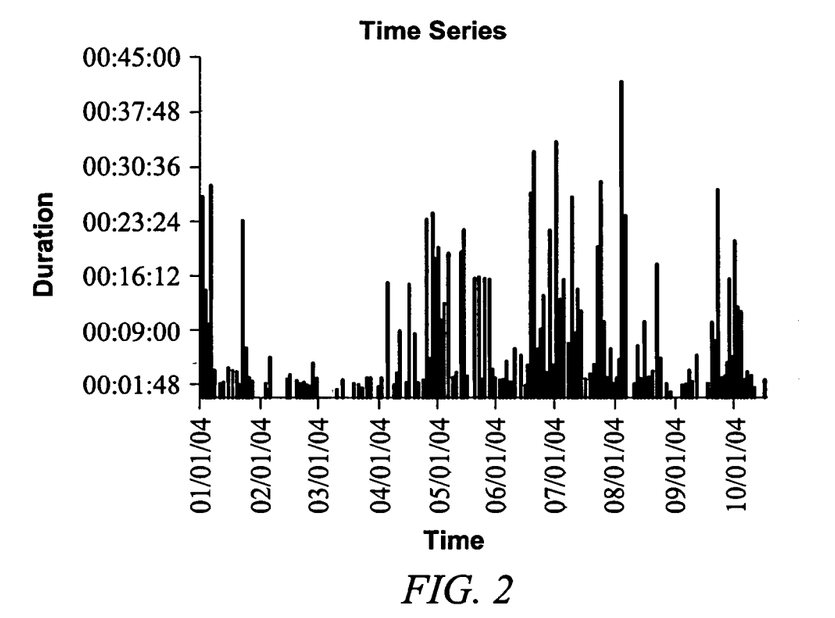
FIG. 2 shows an example of binary data as may be provided by a sensor in combination with a machine controller.

FIG. 2 shows an example of binary data as may be provided by a sensor/PLC. In FIG. 2, data for a ten-month period is displayed. This may be considered raw data, but plotted in a particular way, for clarity. The data is displayed as duration on the vertical axis vs. time of occurrence on the horizontal axis. As mentioned above, the data may be collected having values of either 0 or 1. The duration plotted in FIG. 2 corresponds to the length of a string of 1s, signifying continued occurrence of the event, as described above. While the horizontal axis spans ten months, the vertical axis spans 45 minutes.

Still referring to FIG. 2, the data displayed in FIG. 2 may be converted to uniformly sampled data by processing the data into a histogram. A bin size may be selected according to the frequency of occurrence of a particular event code. For example, a bin size of 10 minutes, 1 hour, several hours, days, or even weeks may be chosen. Choosing (either in a supervised or unsupervised manner) a bin size facilitates conversion from non-uniformed/event driven codes to uniformly sampled data, and feature extraction.

In one embodiment, frequency of occurrence may be extracted by counting how many times the event begins within a time interval (that is, within a bin). In another embodiment, event duration may be extracted by summing the durations of occurrences of events beginning within the time interval. It will be appreciated that "ends" and "ending" may just as well be used instead of "begins" and "beginning" above.

Other features that may be extracted include mean time to repair (MTTR), mean time between failures or events (MTBF), mean part count between failures or events (MCBF), downtime (DTM), and adjusted versions of DTM, MITR, MCBF, and MTBF. Adjusted versions may omit events with few occurrences or zero downtime which may otherwise bias the statistic.

Statistics may also reflect feature extraction corresponding to combinations of event codes. For example, event code aggregation may entail grouping all events or faults which occur in the same machine, or in the same zone. Additional ways to aggregate event data may include events of similar type, which may be treated as a single class of event. In a production facility, machines, stations, and/or zones may be arranged to form parallel production lines, or parallel sections of a production line. For parallel lines, and perhaps even for different production plants, it may provide meaningful statistics to aggregate such data.

Figure 3:
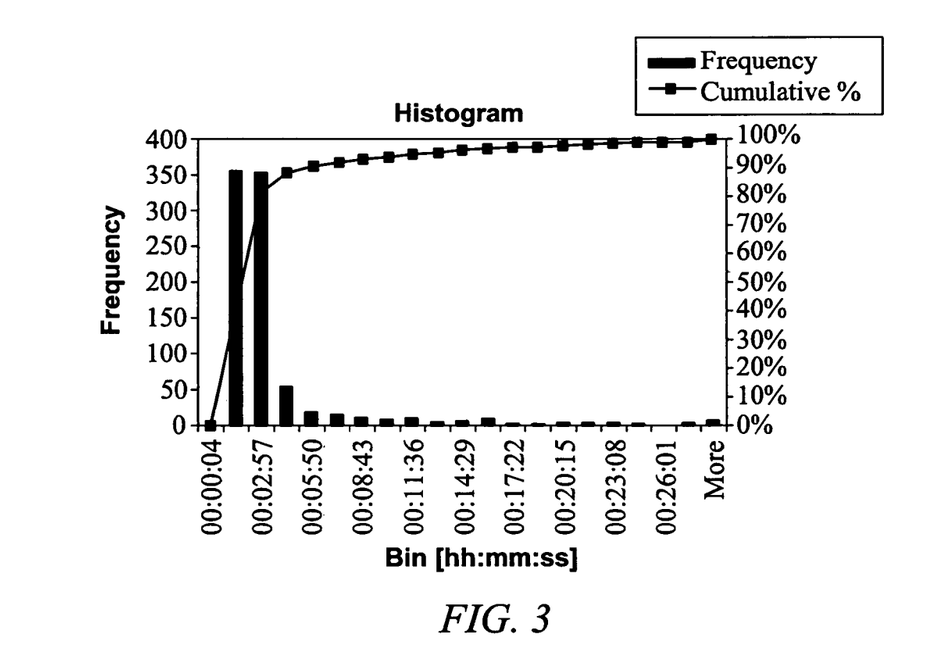
FIG. 3 shows binned data corresponding to FIG. 2, as well as a cumulative distribution function resulting from the same binned data.

Once feature extraction has taken place, for example by generating a histogram as described above, a cumulative distribution function (cdf) may be derived, as shown in FIG. 3. FIG. 3 shows binned data corresponding to FIG. 2. Also plotted in FIG. 3 is a cdf resulting from the same binned data. The cdf is thus an empirical cdf. Alternatively or in addition, an analytic form may be fit to the empirical data.

It will be appreciated that, for some data, MTTR may not provide the best statistic for estimating repair time. For example, as shown in FIG. 3, most of the data occurs in the second and third bins, but the data as displayed in the histogram has a long right tail. There may be more suitable measures (i.e., with better suited statistical properties) than the sample mean and variance to estimate properties of the distribution, such as MTTR. Examination of the histogram, and its associated cdf, for example, may indicate that 85% of the repairs may be made in under 3 minutes. Accordingly, the cdf may thus be a useful feature to extract, along with MTTR, frequency, downtime, and the other features discussed above.

Figure 4:
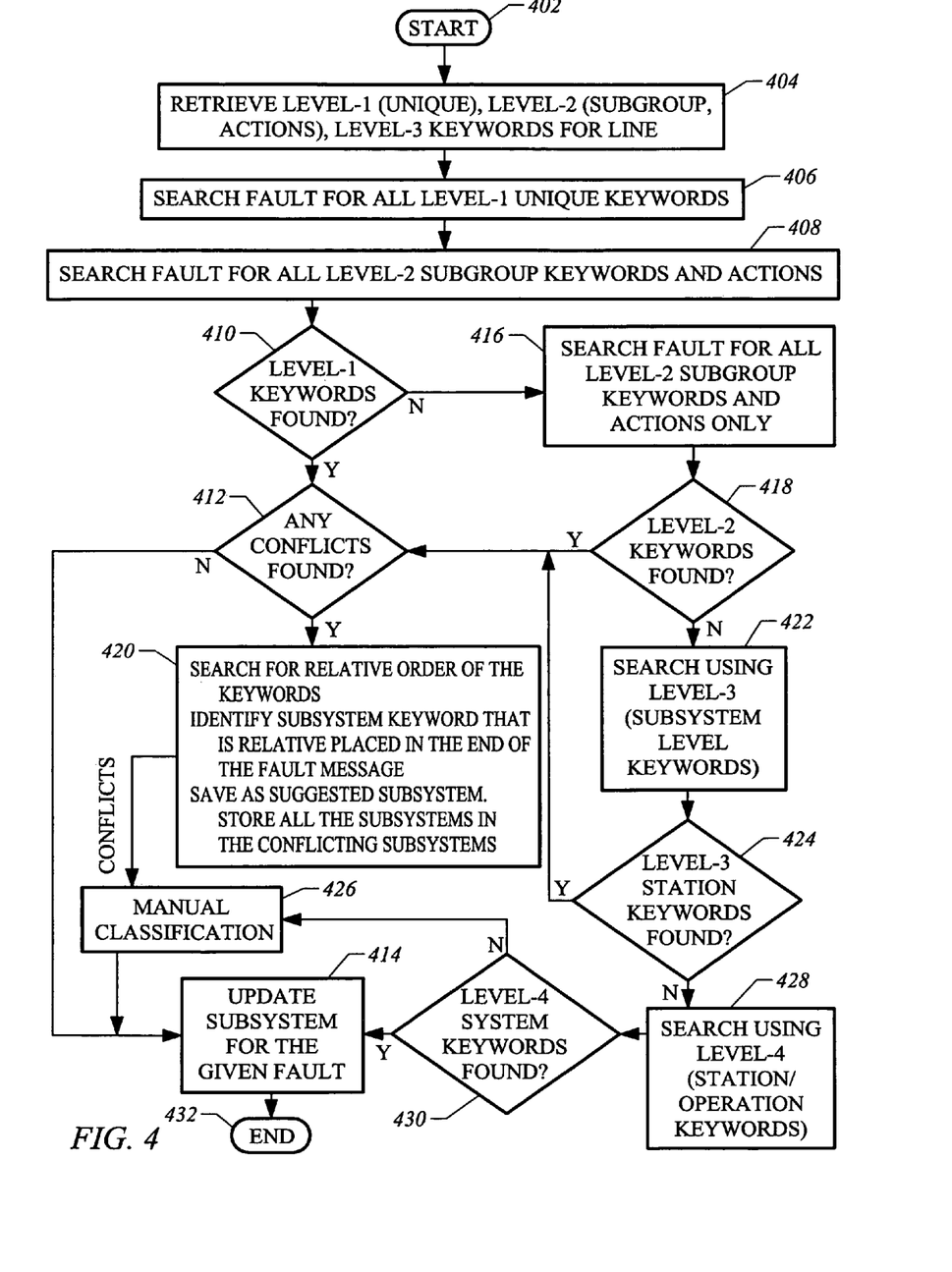
FIG. 4 is a flow chart of an embodiment of a characterization process.

Turning to FIG. 4, a flow chart illustrates a classification process into physical groups (component-based groups). A decision tree is used to parse the fault codes and classify them into groups associated with machine components based on their text. The machine may be divided into main and subcomponents. The decision tree can use the fault text and the fault code range to resolve conflicts in classification. Conflicts in classification occur when fault text, words, or structure satisfy more than one group/component. In this case, fault code range and other detailed rules can be used to identify the correct classification.

Conflicts may arise for example, because different machines may have similar or equal event codes that may mean something different depending on their context. Additionally a keyword that is a clear indication of for example, an electrical type of failure (e.g., Solenoid) may mislead the classifier even when the complete syntactic meaning of the event code denotes another kind of event. Also, it is possible that an event may be classified in several classes simultaneously. In a generic case classifying an event in several classes simultaneously may be possible. Also a new, not previously considered fault message can be generated by a machine and it may become classified into a less appropriate class if the wording of the fault message was not consistent with the pre-existing ones or if for example it is misspelled.

For example, in FIG. 4, after the start 402, a key word search is initiated 404. Level 1 processes unique key words, level 2 processes subgroups such as actions, level 3 processes subsystem level keywords, and level 4 processes station/operation keywords. The search for level 1 begins at 406. The search for level 2 begins at 408. The inquiry is made at 410 as to whether there are keywords found. If keywords have been found then an inquiry is made as to whether there are any conflicts 412. If conflicts are not found, the classification subsystem for a given fault is updated 414.

Referring to decision 410, if no level 1 keywords are found, the subsystem searches for level 2 subgroup keywords and actions 416. An inquiry is made as to whether level 2 keywords are found 418. Also, if conflicts are found 412, a search process 420 is generated. If no conflicts are found, the system can be updated for the given fault at 414. Referring to inquiry 418, level 2 keywords are determined. If any are found, a branch to 412 is taken. If no level 2 keywords are found, the data is searched for level 3 keywords 422. Next, an inquiry is made as to whether the level 3 keywords have been found 424. When this branch is completed and keywords have been found, an inquiry as to whether there are conflicts 412 is initiated. Referring again to search process 420, a search is processed for relative order of the keywords to identify subsystem keywords that are relative. The keyword is placed in the end of the fault message and saved in a suggested subsystem. The subsystems in the conflicting subsystems are stored. In this way, the conflicting subsystems can be automatically or manually ordered 426. The system is updated for the given fault at 414. Returning to decision 424, if a level 3 keyword is not found, then the fault code is processed through level 4 at step 428. A decision is made at 430 as to whether a level 4 fault code has been found. If not, manual classification may take place 426. If it is determined that a level 4 fault code has been found, the subsystem is updated for the fault. It is understood that more levels may be considered as well as a different set of operations to classify the fault codes. The end is reached 432 and preprocessing 104 proceeds.

Similarly, the fault codes may be classified into logical groups. A similar or different decision tree can be used to classify the fault codes in groups that have logical relationships such as faults affecting the product quality, faults associated with operator behavior, or faults that require specific skill trade (e.g. electrician or pipe-fitter). As in the previous section, fault text and fault code range can be used to resolve conflicts in classification.

Another logical classification may be related to the actual line layout. Spatial relationships may define groups. For example, nearby machines may be grouped together. Moreover, machines that collaborate to accomplish a specific part of the process may be grouped, even when they are located in different stations or zones.

In addition to physical groups, logical groups, and spatially related groups, ad hoc groups may be defined. An ad hoc group may be, for example, all machines that drill holes (or, for example, all assembly operations performed manually). Those machines are not necessarily in the same zone or station and they may even be in completely different parts of the plant (or even other plants); however, they all have similar characteristics even when they may be doing completely different tasks that may not be related at all.

Using the fault classification in analysis tools and other maintenance information systems may provide additional information. The faults classification subsystem in the preprocessing 104 may be used to identify machine components with high fault occurrences, downtime, or mean time to repair (or other statistics associated with machine performance) in one machine and across different machines, and to correlate faults across different machines using, for example, a periodic behavior analysis tool.

Fault code classification may be used in a repair log database, for example, a computerized maintenance management system (CMMS). Machine components may have specific job plans in the factory or plant maintenance IT system. Fault classification may be accordingly associated with these components. They can be utilized to generate CMMS work orders using user-defined criteria for occurrence and downtime associated with the component.

Additionally, fault code classification may be used in an e-guidance tool, providing electronic information guidance for problem diagnosis, such as history of the problem, needed drawings, and manuals. The documentation available for machine components—manuals, setup procedure, troubleshooting procedures and schematics—are classified in the same groups of faults classification. Skilled trades who utilize available information that relates to the machine faults may use this tool.

Also fault classification may be used in the quality control system. The logical group classification can be used to rate machine performance with respect to the quality level of parts produced by the machine. This performance may be used in a discrete event simulation (DES) model to represent machine malfunctioning as a factor in reducing the overall quality of the production line.

Briefly returning to FIG. 1, preprocessing 104 further may include sorting by fault codes 110 to produce fault trend data. In sorting faults 110, the faults can be sorted by their downtime durations, number of occurrences, or adjusted MTTR ratios (mean time to repair, adjusted by excluding events with very few occurrences or zero downtime). Fault trends can provide information, such as whether fault frequency is increasing or decreasing and whether the velocity and acceleration of the frequency is increasing or decreasing. Additionally, MTTR provides an estimate of the average time it may take to fix the fault and restore machine functioning. In one embodiment, the top N downtime faults or top N most frequently occurring faults may be chosen for display or output, where N can be defined based on the application but typically may range from 5 to 25, for example. The top group number N chosen, however, may be predetermined by the user according to specified criteria and may be of any magnitude. Other information about the fault codes in fault trends may be provided, such as deviations from the top group number. Those whose rankings have changed can be highlighted and marked for users.

As shown in FIG. 1, the fault trend data can be then processed to generate output for the current state 114 and for the future state 116 in the form of reports, alerts and predictions. This fault trend data is reported by reporting system 112 of the current state processor 114. At the same time, an alert module will check the reports to decide whether any control action may be needed immediately. If so, alerts will be issued through control action module 116. If not, the future state processor 118, which includes prediction analyzers, may predict their future behaviors, and may then determine whether any control action such as one or more alerts is needed.

Reporting 112 may provide users greater understanding of fault codes and the overall state of faults in the system. Reports or feature presentation 119 can be generated in various forms such as a list of the top five or top ten that have the greatest impact on production. Also, trend reports are available that describe the changing patterns of fault codes as a function of time so that users may also understand the general fault behavior of the system as well. Another reporting capability is the statistical analysis of reports from a historical perspective. Periodic analysis reports may also provide the user a view of the pattern of fault codes as they are generated. The combination of some or all of the above forms of reports may provide as a whole the user with knowledge of the manufacturing or assembly plant as it generates fault codes. The reporting may provide the user with a current state and future state understanding of the plants' fault code generating behavior.

Prediction analyzers may predict fault behavior for the future state. If control action is not needed at the time the process is running 120, marked faults may be sent to prediction analyzers to predict fault behavior. Predicted behavior can be used to calculate how much downtime malfunctions could cause for future production. If the downtime is significantly greater than preset criteria values, an alert 122 can be communicated to the decision makers via different means such as HMI 112 (human-machine interface) for control action 116. An HMI is a generic technical term that describes a machine display such as a computer monitor touch screen through which a human operator can receive information and enter information to execute computer generated control actions. Control actions may include, for example, issuing work orders, changing maintenance schedule, re-establishing maintenance priorities, and preparing all document or information for quick diagnosis for these faults. The prescribed course of action may be issued automatically or manually.

As described herein the system, method and apparatus provide for processing historical fault data which comes from machine controllers and is stored in the database for a predetermined period of time. Generally, the amount of data is determined by the user. However, certain algorithms are designed to process large amounts of data to generate the output described herein. Integration of a plurality of fault analysis algorithms to operate on the preprocessed historical fault code data can run in series or in parallel, depending on the computing system and the user's preference or requirements. Certain types of preprocessed data may provide different results on different analyzers. Additional analysis may resolve conflicts or ambiguities.

Figure 5:
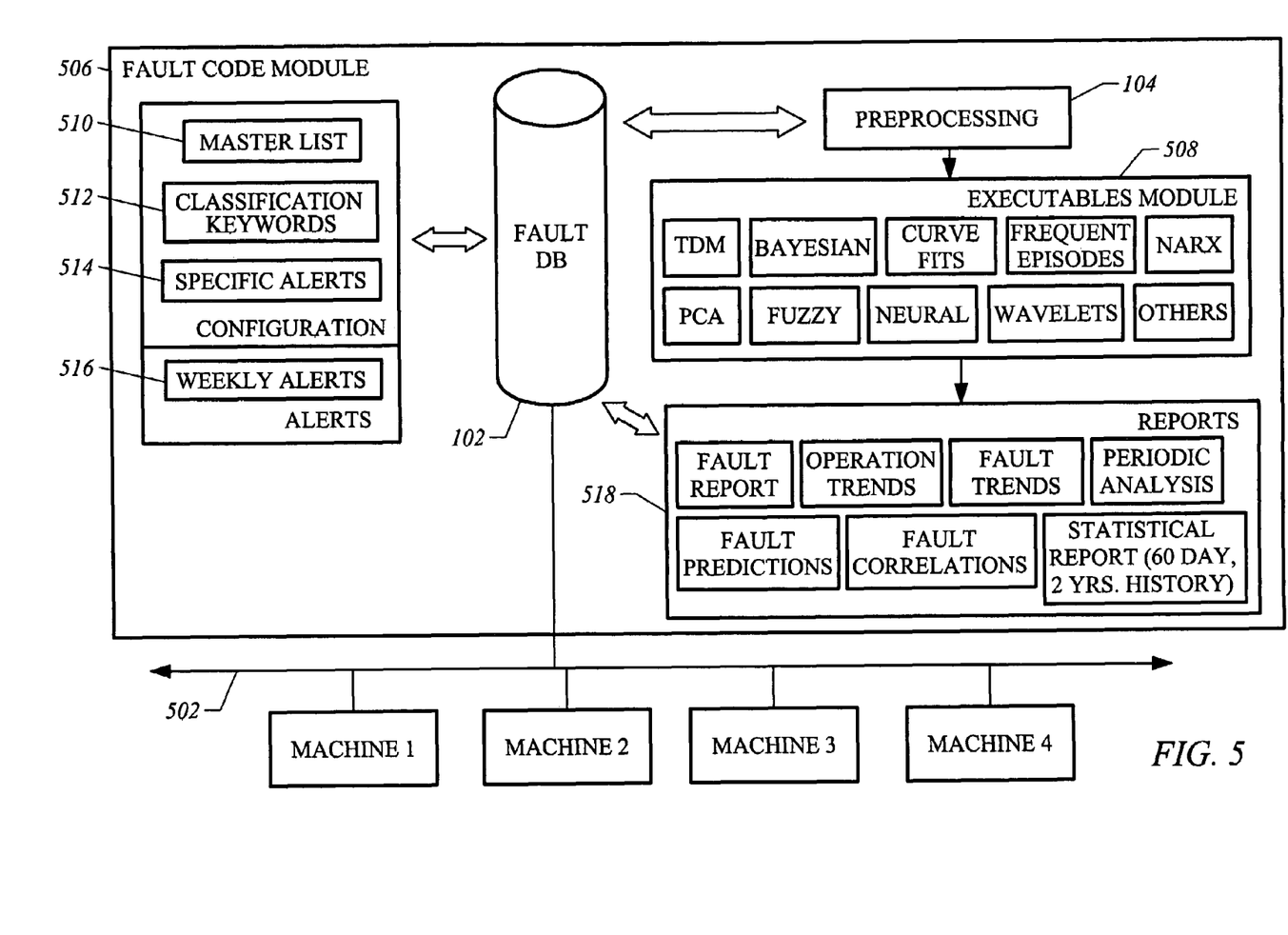
FIG. 5 is a system diagram of an embodiment of a system and apparatus including modules.

A system and apparatus may be like that shown in FIG. 5. Machines 1-4 are in communication via network 502 with a fault database 102. Various modules such as the fault module 506, including analyzer executable module 508, provide certain components of the system for operation of the method as described herein. Although FIG. 5 shows four machines, any number of machines of the line or plant may be providing data to fault database 102 via network 502.

The fault database 102 may collect data for a predetermined period of time as described above. In general, all relevant data is collected in a buffer where it may be stored at the highest degree of granularity possible. This buffer may be kept as a working buffer. Its length may vary again from days to years depending on the amount of data. If possible this data, which may be constantly replaced from a rollover buffer, is stored offline before being discarded. A secondary buffer may be created with partial summary results. For example, total downtime and number of occurrences per hour, per shift, or per day may be calculated and stored in a smaller database. This summary data may be kept indefinitely (most likely even online). The amount of fault data provided to the database 102 over a period of time may vary depending upon the number of machines of the line or plant providing data to the system. The amount of data processed may be predetermined, or may be generated on an ad hoc basis.

In the preprocessing module 104, a master list of fault codes 510 may be provided along with a keyword classification table 512. Particular alerts such as weekly or specific alerts may be configured 514 as well. Certain alerts may be predefined, such as weekly alerts 516. These and other configuration and alert modules may be part of fault module 506. The fault module in general provides standard input and output interfaces which may be in an XML format, for example.

Analyzer executable module 508 includes algorithms that recognize hidden patterns for prediction. These algorithms may include a temporal data mining module, a Markov model or other Bayesian predictor module, a curve-fitting and trending module, a frequent episode discovery module, a NARX (Nonlinear Auto-Regressive with eXogenous inputs) module, a neural network module, and modules incorporating sub-band decomposition techniques (for example, Time-Frequency analysis, Wavelets analysis, and others), fuzzy logic, auto-regressive models, and/or principal components analysis, or any other kind of estimator or predictor.

The temporal data mining module operates to discover patterns in the data for predicting trends. The Bayesian predictor module operates to model statistical trends in the data, for example, using a trained Markov model. The curve-fitting module operates to fit the data to well-defined functional forms for trend analysis and prediction. The frequent episode module, like the temporal data mining module, operates to discover patterns in the data. The NARX module operates to model the data with a non-linear autoregressive machine learning model, e.g., a neural network or other machine learning model. A pure neural network module may model the data without NARX techniques. Sub-band decomposition techniques may model data trends in particular frequency intervals (e.g., hours, shifts, days, week-ends, months, or seasons, among others). A module incorporating fuzzy logic may model data and predict trends based on class membership functions, rather than working only with crisp values for data features. Auto-regressive models may be non-linear (NARX, mentioned above, is one example) or linear. Principal components analysis may reduce the dimensionality of a data reduction problem by extracting significant, low dimensional features from a much larger, high-dimensional data set.

The reports, alerts and predictions 518 may be generated according to the results of a plurality of modules combined. It will be understood that this list of analyzer executable modules is not all inclusive. The system may include or not include all listed analyzer executable modules. It will be understood that the system described herein may further include other analyzer executable modules and reports not described.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A method for reporting, making alerts and predicting fault codes generated by machines in a line, comprising:
   preprocessing historical fault code data comprising fault codes, wherein preprocessing comprises:
      receiving stored historical fault code data generated by the machines;
      filtering the historical fault code data according to particular criteria to generate filtered fault code data;
      parsing text of the filtered fault code data;
      classifying the filtered fault code data into physical groups, each physical group associated with a component of the machines and corresponding to the parsed text of the fault code data;
      classifying the filtered fault code data into logical groups, each logical group including a plurality of the fault codes having a logical relationship associated through the parsed text of the fault code data; and
      sorting the physical groups and the logical groups to produce fault trend data; and
   processing the fault trend data with a plurality of analyzers to generate report output.

2. The method recited in claim 1, wherein the historical fault code data comprises a predetermined amount of data that is compiled over a predetermined time period.

3. The method recited in claim 1 wherein the machines in the line operate during production time and do not operate during non-production time, and wherein the filtering comprises: eliminating fault codes generated during non-production time.

4. The method as recited in claim 1 wherein the received fault codes comprise duplicates and non-duplicates, and wherein filtering comprises: eliminating duplicate fault codes.

5. The method recited in claim 1 wherein faults codes occur at specific times, and wherein filtering comprises: combining two fault codes if the time between them is less than a predetermined period of time.

6. The method recited in claim 1 wherein the machines in the line produce product that has particular quality, and wherein classifying comprises: categorizing the fault codes into those affecting the product quality.

7. The method as recited in claim 1 wherein classifying comprises: categorizing the fault codes into those associated with operator behavior.

8. The method as recited in claim 1 wherein classifying comprises: categorizing the fault codes into those requiring attention of maintenance personnel with specific skills.

9. The method as recited in claim 1 wherein particular fault codes have more impact on the machines in the line than other fault codes, and wherein processing comprises: reporting the number of fault codes having the more impact on the machines in the line than other fault codes.

10. The method as recited in claim 1, further comprising: generating reports comprising current state output.

11. The method as recited in claim 1, further comprising: generating reports comprising future state output.

12. A system for reporting, making alerts and predicting fault codes generated by machines in a line, comprising: a preprocessing module comprising:
   a receiving module capable of receiving historical fault code data comprising fault codes;
   a filtering module capable of filtering the historical fault code data according to particular criteria to generate filtered fault code data;
   a first classifying module for classifying the filtered fault code data into physical groups, each physical group associated with a component of the machines and corresponding to the fault code data;
   a second classifying module for classifying the filtered fault code data into logical groups, each logical group including a plurality of the fault codes having a logical relationship associated through the fault code data;
   a sorting module for sorting the physical groups and the logical groups to produce fault trend data; and
   a processing module for processing the fault trend data with a plurality of analyzers to generate report output.

13. The system as recited in claim 12, wherein the historical fault code data comprises a predetermined amount of data that is compiled over a predetermined time period.

14. The system as recited in claim 12 wherein particular fault codes have more impact on the machines in the line than other fault codes, further comprising: a reporting module for reporting the number of fault codes having the more impact on the machines in the line than other fault codes.

15. The system as recited in claim 12, wherein the report output comprises: current state output.

16. The system as recited in claim 12, wherein the report output comprises: future state output.

17. An apparatus for reporting, making alerts and predicting fault codes generated by machines in a line, comprising:
   a database for storing historical fault code data comprising fault codes;
   a filtering unit for filtering the historical fault code data according to particular criteria to generate filtered fault code data;

a classifying unit for classifying the filtered fault code data into physical groups and into logical groups;

each physical group associated with a component of the machines and corresponding to the fault code data, and each logical group including a plurality of the fault codes having a logical relationship associated through the fault code data;

a sorting unit for sorting the physical groups and the logical groups to produce fault trend data; and a processor for processing the fault trend data with a plurality of analyzers to generate report output.

18. The apparatus as recited in claim 17, wherein the historical fault code data comprises a predetermined amount of data that is compiled over a predetermined period of time.

19. The apparatus as recited in claim 17, wherein the report output comprises: current state output.

20. The apparatus as recited in claim 17, wherein the report output comprises: future state output.

21. A method for analyzing fault data associated with a plurality of production line machines, comprising:

collecting and compiling a plurality of fault codes associated with the production line machines;

parsing each fault code;

executing a keyword search of the parsed fault code;

classifying each fault code in one of a plurality of physical groups based upon the keyword search of the parsed fault code, each physical group associated with a component of the production line machines;

classifying each fault code into one of a plurality of logical groups based upon the keyword search of the parsed fault code, each logical group including a plurality of the fault codes having a logical relationship associated through the keywords of the plurality of fault codes;

sorting the physical groups and the logical groups; and generating fault trend data associated with the plurality of fault codes associated with the production line machines classified in the physical groups and logical groups.

22. The method of claim 21, further comprising classifying each fault code in one of a plurality of ad hoc groups based upon the keyword search of the parsed fault code, each ad hoc group associated with a specific manufacturing process of the production line machines; and generating fault trend data associated with the plurality of fault codes associated with the production line machines classified in the physical groups, the logical groups, and the ad hoc groups.

23. The method of claim 21, further comprising classifying each filtered fault code in one of a plurality of logical groups based upon the keyword search of the parsed fault code, each logical group comprising keywords having a logical relationship associated with one of product quality, operator behavior, a skilled trade, and a spatial relationship of the machines.

* * * * *